June 16, 1925.
C. A. CHRISTOFFERSON
ANTIFRICTION PIPE CARRIER
Filed April 22, 1921
1,541,791
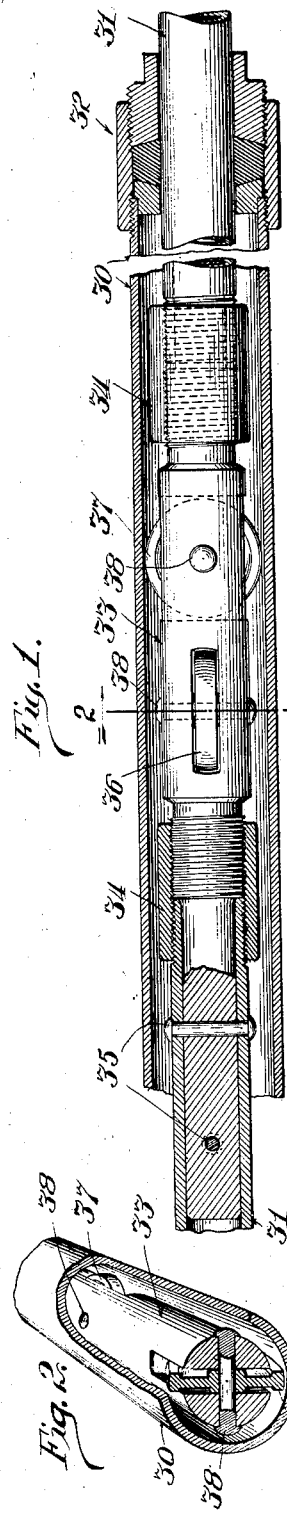
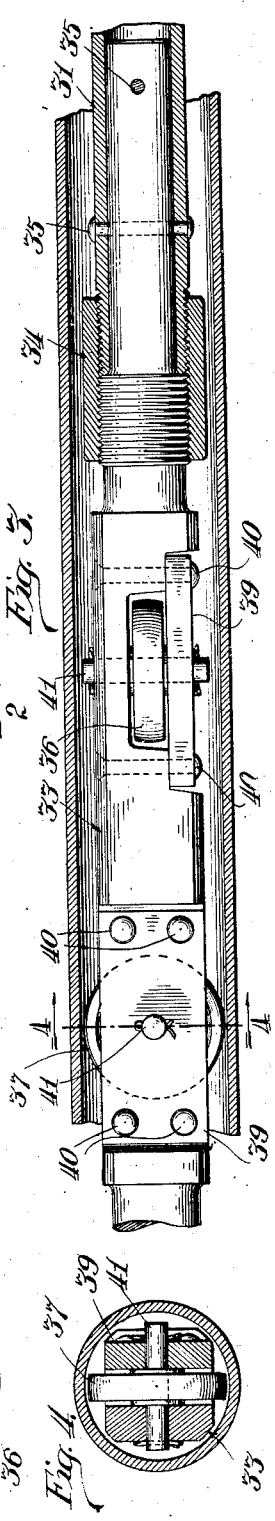
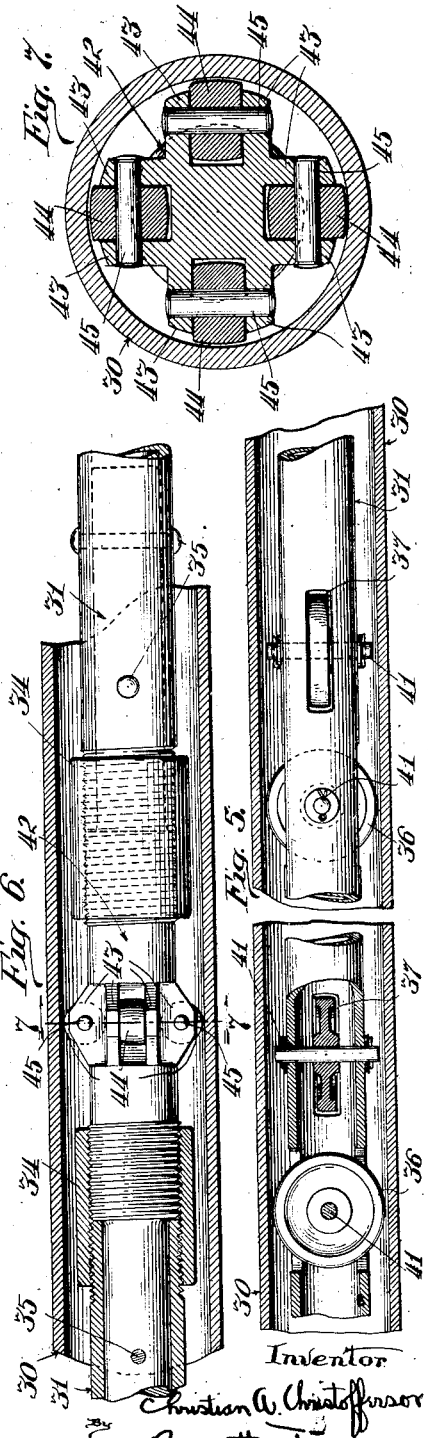
Inventor
Christian A. Christofferson Patented June 16, 1925.

1,541,791

UNITED STATES PATENT OFFICE.

CHRISTIAN A. CHRISTOFFERSON, OF ST. PAUL, MINNESOTA.

ANTIFRICTION PIPE CARRIER.

Application filed April 22, 1921. Serial No. 463,535.

*To all whom it may concern:*

Be it known that I, CHRISTIAN A. CHRISTOFFERSON, a citizen of the United States, residing at St. Paul, in the county of Ramsey and State of Minnesota, have invented certain new and useful Improvements in Antifriction Pipe Carriers, of which the following is a specification.

My invention relates to anti-friction pipe carriers designed particularly for use in connection with a mechanical interlocking system of railway switches and signals. In systems of this type, it is common to connect the switches and signals to be operated with a series of cooperating levers in a central tower or cabin, such connection being effected by the use of pipes and levers, a single line of connecting piping serving to cause the desired movement at the switch or the signal at a considerable distance from the central point. In systems of this type in use heretofore, it has been customary to enclose the operating pipe within a second pipe of larger diameter at points where special protection has been necessary, as at the point where such a line of pipe crosses a street or roadway. Such protecting pipes have been closed at their ends about the operating pipes by suitable stuffing boxes, and the outer pipes have ordinarily been kept filled with oil or other suitable lubricant. Such constructions have been objectionable for the reason that the outer pipe is worn through rapidly in many cases, permitting the oil to escape and permitting the entrance of rain, snow, grit, etc. Special maintenance care has been required, accordingly, to prevent the clogging up or freezing of the protecting pipe. Moreover, even in cases where the protecting pipe has remained for a long period intact, the friction has been very great, serving to reduce very materially the distance at which a signal or switch can be operated from the tower in cases where any considerable portion of the line of operating pipe has been enclosed, as above described.

In view of the nature of the work of a tower man and of the responsibility which he must carry while on duty, any unnecessary tiring work is highly objectionable, from the standpoint of public safety.

It is the principal object of my invention to provide a construction and arrangement of parts by the use of which ample protection may be provided; by which the friction may be reduced to a minimum; by which the wear on the parts may be greatly reduced; and by which other advantages may be provided, as is hereinafter set forth. The preferred means by which I have accomplished my several objects are illustrated in the drawings and are hereinafter specifically described. That which I believe to be new and desire to cover by this application is set forth in the claim.

In the drawings,

Fig. 1 is a longitudinal vertical section through a protecting pipe and through a fragmentary portion of the operating pipe located therein, illustrating the preferred form of my improvement.

Fig. 2 is a perspective view, partly in section, taken on line 2—2 of Fig. 1.

Fig. 3 is a view similar to Fig. 1 but showing a modified form of construction.

Fig. 4 is a vertical section taken on line 4—4 of Fig. 3.

Fig. 5 is a view similar to Fig. 1 but showing another modified form of construction, and showing two sets of anti-friction devices which are located at intervals along the operating pipe.

Fig. 6 is a view similar to Fig. 1 but showing still another modified form of construction.

Fig. 7 is an enlarged cross section taken at line 7—7 of Fig. 6.

Referring now to Figs. 1 and 2, in which the preferred form of construction is illustrated, 30 indicates a protecting pipe which is adapted to be buried below the surface of a roadway for protecting the pipe 31 which extends through the pipe 30, serving to insure an easy longitudinal movement of the pipe 31. The pipe 30 is preferably closed at each end about the pipe 31 by means of a stuffing box of any suitable construction, the box illustrated in Fig. 1 being indicated by the numeral 32. As is clearly shown in Fig. 1, the pipe 31 is made in sections, the adjacent ends of the two sections being connected by means of an intermediate member or bar 33. The bar 33 is connected with the sections 31 of the pipe, by means of sleeve connectors 34 which are held by means of screw threads in position upon the two parts to be connected. The sections 31 of the pipes are further connected to the bar 33 by means of riveted pins 35 passing through the tang ends of the bar for providing the desired anti-friction support of the pipe 31 from the pipe 30. I have provided anti-friction rollers 36 and 37 which are located in suitable openings through the bar 33, being mounted revolubly in position in such openings by the use of pins or rivets 38. The arrangement is such that the rollers 36 and 37 stand at right angles to each other, each being adapted to extend substantially across the pipe 30 so as to stand in contact with the inner face of the pipe at one side or the other, the treads of the rollers being curved transversely, to correspond with the curvature of the inner wall of the pipe. By the use of a set of anti-friction rollers 36 and 37 at intervals of six or seven feet along the operating pipe 31, the desired freedom of movement of the pipe 31 is assured; the friction is maintained at a minimum; the power transmitting member constructed as above described is very rigid and is kept from bending under very great stress by the bearing of the rollers on the pipe 30; and the wear upon the inner face of the pipe 30 is caused to be very slight and very gradual.

In the construction shown in Figs. 3 and 4, one side of the bar 33 is cut away in the process of providing the openings for the anti-friction rollers the cut-away side portion of the bar being replaced by a plate 39 which is retained in position by a plurality of rivets 40. The anti-friction rollers 36 and 37 are held in position by means of removable pins 41 in lieu of the rivets 38 of the construction shown in Fig. 1. The operation and effect of the rollers 36 and 37 of the construction shown in Figs. 3 and 4 are the same as those of the rollers 36 and 37 of Figs. 1 and 2.

In the construction shown in Fig. 5, the bar 33 is eliminated, the rollers 36 and 37 being held by the pins 41 in openings cut in the pipe 31, the operation and effect being the same.

In the construction of Figs. 6 and 7, a modified form of coupling bar is illustrated, the same being indicated by the numeral 42. The bar 42 is connected with the sections 31 of the operating pipe in the same manner as that already described in connection with the bar 33. The bar 42 is provided at each of its four sides with two oppositely disposed ears 43, as is best seen in Fig. 7, a roller 44 being revolubly mounted in position between each pair of ears 43 by the use of a pin or rivet 45. As will be readily understood, the four rollers 44 operate in a slightly different manner from that of the two rollers 36 and 37, but the general effect is the same, in that the friction is very small in either instance.

I claim:

A device for operating a switch or signal, comprising a substantially horizontally disposed stationary pipe; and a power transmitting member extending through said pipe consisting of a number of pipe sections, intermediate members, each comprising a bar with comparatively long tang ends inserted in the ends of the adjacent pipe sections, connecting sleeves enclosing and threaded upon the adjoining ends of the bar and pipe section, a pair of pins at substantially right angles to each other secured through each pipe section and the tang therein, the bar having slots extending therethrough at substantially right angles to one another, and rollers mounted in said slots having treads curved transversely to correspond with the curvature of the inner wall of said stationary pipe and diameters approximately the internal diameter of the said pipe with sufficient clearance only to permit longitudinal movement of said power transmitting member while preventing bending of the same within said pipe.

CHRISTIAN A. CHRISTOFFERSON.